(12) United States Patent
Liu et al.

(10) Patent No.: US 11,482,162 B2
(45) Date of Patent: Oct. 25, 2022

(54) APPARATUS, SYSTEM, AND METHOD FOR EFFICIENTLY DRIVING VISUAL DISPLAYS VIA LIGHT-EMITTING DEVICES

(71) Applicant: Meta Platforms Technologies, LLC, Menlo Park, CA (US)

(72) Inventors: Yuming Liu, Mountain View, CA (US); Xiaobei Li, Sammamish, WA (US); Lawrence Chang-Yung Wang, Mountain View, CA (US); Sam Sarmast, Redmond, WA (US); Phillip Freeman King, Kirkland, WA (US); Benjamin Nicholas Jones, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/408,190

(22) Filed: Aug. 20, 2021

(65) Prior Publication Data

US 2021/0383745 A1 Dec. 9, 2021

Related U.S. Application Data

(63) Continuation of application No. 16/788,601, filed on Feb. 12, 2020, now Pat. No. 11,145,242.

(51) Int. Cl.
*G09G 3/32* (2016.01)
*G02B 27/01* (2006.01)
(Continued)

(52) U.S. Cl.
CPC ........... *G09G 3/32* (2013.01); *G02B 27/0172* (2013.01); *H02M 3/1582* (2013.01);
(Continued)

(58) Field of Classification Search
CPC .. G09G 3/32; G09G 3/003; G09G 2300/0828; G09G 2330/028;
(Continued)

(56) References Cited

U.S. PATENT DOCUMENTS

2008/0284397 A1 11/2008 Chang
2010/0296324 A1 11/2010 Boeke
(Continued)

FOREIGN PATENT DOCUMENTS

CN 110336068 A 10/2019

OTHER PUBLICATIONS

International Search Report and Written Opinion for International Application No. PCT/US2020/052981, dated Jan. 21, 2021, 12 Pages.
(Continued)

*Primary Examiner* — Brent D Castiaux
(74) *Attorney, Agent, or Firm* — FisherBroyles, LLP

(57) ABSTRACT

An apparatus for efficiently driving visual displays via light-emitting devices may include (1) at least one light-emitting device, (2) a buck driver circuit electrically coupled to the light-emitting device, wherein the buck driver circuit includes an inductor, and (3) a boost circuit electrically coupled between the buck driver circuit and a power source, wherein the boost circuit includes an additional inductor. Various other apparatuses, systems, and methods are also disclosed.

20 Claims, 13 Drawing Sheets

(51) Int. Cl.
*H02M 3/158* (2006.01)
*H02K 47/02* (2006.01)

(52) U.S. Cl.
CPC ............... *G02B 2027/0178* (2013.01); *G09G 2300/0828* (2013.01); *G09G 2330/028* (2013.01); *H02K 47/02* (2013.01)

(58) Field of Classification Search
CPC ............ G02B 27/0172; G02B 27/017; G02B 2027/0178; H02M 3/1582; H02M 3/003; H02M 3/157; H02M 3/156; H02M 1/007; H02K 47/02; G06F 3/147; H05B 45/375; H05B 45/38
See application file for complete search history.

(56) References Cited

U.S. PATENT DOCUMENTS

| | | |
|---|---|---|
| 2011/0085576 A1 | 4/2011 | Crawford et al. |
| 2015/0208469 A1 | 7/2015 | Coetzee et al. |
| 2017/0019965 A1 | 1/2017 | Takacs |
| 2017/0192499 A1 | 7/2017 | Trail |
| 2018/0056853 A1 | 3/2018 | Muramatsu et al. |
| 2018/0286320 A1* | 10/2018 | Tardif ................ G02B 27/0172 |
| 2020/0366206 A1* | 11/2020 | Hariharan ............. H05B 45/38 |

OTHER PUBLICATIONS

International Preliminary Report on Patentability for International Application No. PCT/US2020/052981, dated May 12, 2022, 10 pages.

* cited by examiner

APPARATUS, SYSTEM, AND METHOD FOR EFFICIENTLY DRIVING VISUAL DISPLAYS VIA LIGHT-EMITTING DEVICES

CROSS REFERENCE TO RELATED APPLICATION

This application is a continuation of U.S. application Ser. No. 16/788,601 filed 12 Feb. 2020, the disclosure of which is incorporated in its entirety by this reference.

BRIEF DESCRIPTION OF DRAWINGS

The accompanying Drawings illustrate a number of exemplary embodiments and are parts of the specification. Together with the following description, the Drawings demonstrate and explain various principles of the instant disclosure.

Figure 1:
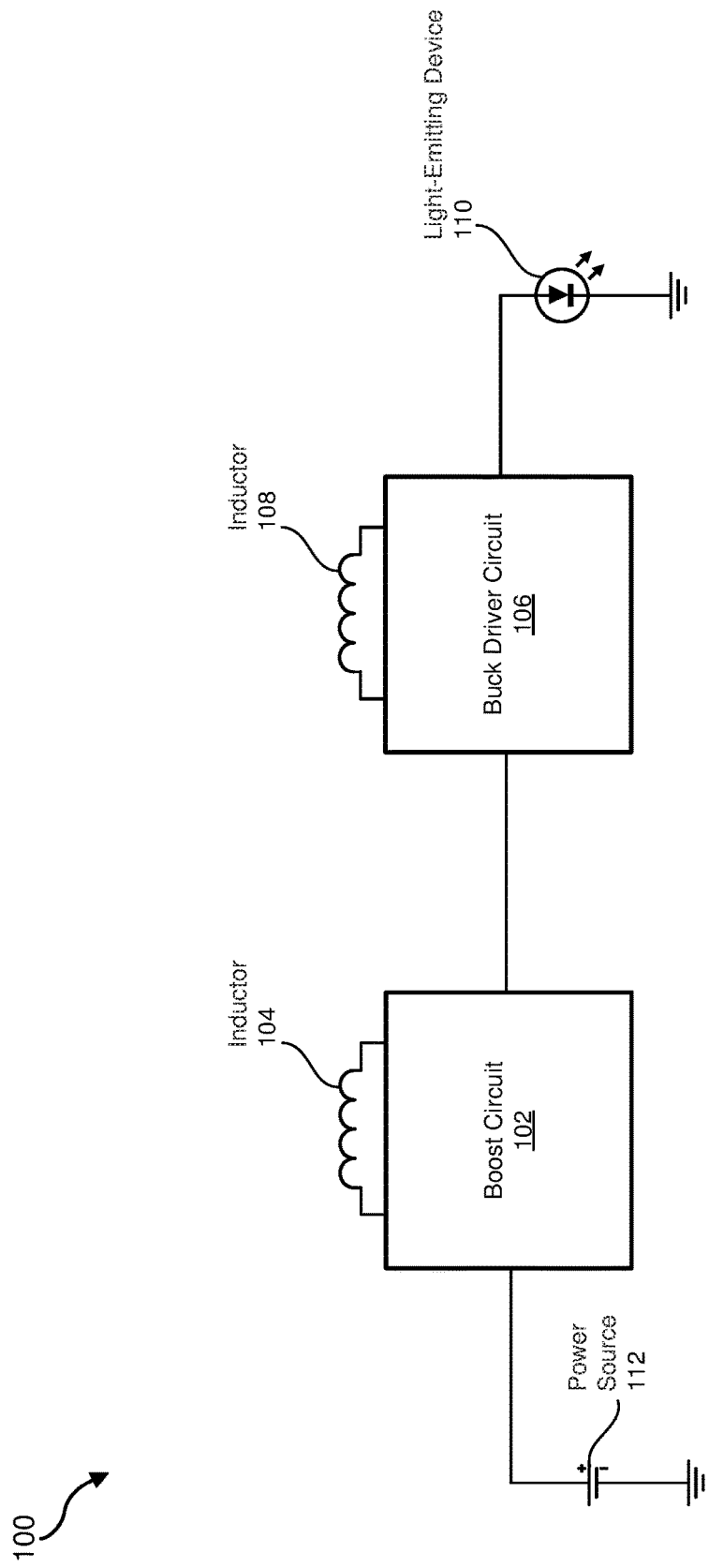
FIG. 1 is an illustration of an exemplary apparatus for efficiently driving visual displays via light-emitting devices.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to apparatuses, systems, and methods for efficiently driving visual displays via light-emitting devices. As will be explained in greater detail below, these apparatuses, systems, and methods may provide numerous features and benefits.

In some examples, artificial reality systems may include and/or incorporate head-mounted displays that enable users to experience certain forms of artificial reality (such as virtual reality, augmented reality, mixed reality, and/or hybrid reality). In one example, a head-mounted display may include and/or represent a visual display whose light-emitting devices (such as laser diodes, laser projectors, and/or pixels) are driven by circuitry that is electrically inefficient, consumes a significant amount of space and/or real estate, and/or necessitates high equipment and/or manufacturing costs. The instant disclosure, therefore, identifies and addresses a need for improved apparatuses, systems, and methods for efficiently driving visual displays via light-emitting devices.

In some examples, the various apparatuses, systems, and methods disclosed herein may include and/or incorporate multi-stage driver circuitry that facilitates driving visual displays more efficiently and/or with a more compact footprint than traditional driver circuitry. In one example, the multi-stage driver circuitry may include and/or represent a combination of digital boost (e.g., step-up) and capacitor-less buck (e.g., step-down) circuitry, which is sometimes referred to as a buck-boost converter. In this example, the buck-boost converter may include and/or incorporate an energy-storage capacitor between the boost and buck circuitry. Additionally or alternatively, the buck-boost converter may exclude and/or omit large bypass capacitors often applied in parallel with the light-emitting devices of traditional visual displays.

The energy-storage capacitor incorporated into the buck-boost converter may be smaller, and thus consume less space and/or real estate, than the large bypass capacitors often applied in parallel with the light-emitting devices of traditional visual displays. As a result, in additional to increasing the power efficiency with digital boost and capacitor-less buck circuitry, this buck-boost converter may help conserve equipment and/or manufacturing costs by eliminating and/or mitigating the need for such large bypass capacitors. Additionally or alternatively, this buck-boost converter may help conserve space and/or real estate in connection with the visual display by reducing and/or decreasing the necessary driver footprint.

The following will provide, with reference to FIGS. 1-6, detailed descriptions of various systems, components, and/or implementations capable of efficiently driving visual displays via light-emitting devices. The discussion corresponding to FIG. 7 will provide detailed descriptions of an exemplary method for efficiently driving visual displays via light-emitting devices. The discussion corresponding to FIGS. 8-13 will provide detailed descriptions of types of exemplary artificial reality devices and/or systems that may facilitate and/or contribute to users' artificial reality experiences.

FIG. 1 illustrates an exemplary apparatus 100 that efficiently drives visual displays via light-emitting devices. In some examples, apparatus 100 may include and/or represent a combination of a boost circuit 102 and a buck driver circuit 106 that are electrically coupled to one another. In such examples, apparatus 100 may also include and/or represent a light-emitting device 110 electrically coupled to buck driver circuit 106. In addition, apparatus 100 may include and/or represent a power source 112 electrically coupled to boost circuit 102.

In some examples, boost circuit 102 and buck driver circuit 106 may each include and/or incorporate a separate inductor. For example, boost circuit 102 may include and/or have an inductor 104. Additionally or alternatively, buck driver circuit 106 may include and/or have an inductor 108.

Inductors 104 and 108 may be of various shapes, sizes, and/or dimensions. In one example, inductor 104 may be a rectangular surface-mount component with a 2 millimeter (mm)×1.5 mm footprint. Additionally or alternatively, inductor 108 may be a rectangular surface-mount component with a 2.5 mm×2 mm footprint.

Inductors 104 and 108 may exhibit and/or have any of a variety or range of inductance values. In one example, inductor 104 may exhibit and/or have an inductance value of 2.2 microhenries (uH). Additionally or alternatively, inductor 108 may exhibit and/or have an inductance value of 4.7 uH.

In some embodiments, apparatus 100 may include and/or incorporate one or more additional components that are not represented and/or illustrated in FIG. 1. For example, and as will be described in greater detail below, boost circuit 102 and buck driver circuit 106 may each include and/or incorporate transistors, resistors, capacitors, and/or diodes, among other components. In addition, apparatus 100 may include and/or incorporate transistors, resistors, capacitors, and/or diodes external to and/or outside boost circuit 102 and/or buck driver circuit 106.

In some examples, the phrase "to couple" and/or the term "coupling", as used herein, may refer to a direct connection and/or an indirect connection. For example, a direct electrical coupling between two components may constitute and/or represent a coupling in which those two components are directly connected to each other by a single node that provides electrical continuity from one of those two components to the other. In other words, the direct coupling may exclude and/or omit any additional components between those two components.

Additionally or alternatively, an indirect electrical coupling between two components may constitute and/or represent a coupling in which those two components are indirectly connected to each other by multiple nodes that fail to provide electrical continuity from one of those two components to the other. In other words, the indirect coupling may include and/or incorporate at least one additional component between those two components.

In some examples, power source 112 may include and/or represent any type or form of power source capable of providing sufficient electric current to meet the demands and/or needs of light-emitting device 110. In one example, power source 112 may include and/or represent a battery that provides electric current to light-emitting device 110 via boost circuit 102 and buck driver circuit 106. Additional examples of power source 112 include, without limitation, a Direct Current (DC) power supply, an Alternating Current (AC) power supply, an AC-to-DC transformer, a voltage regulator, a rectifier, combinations or variations of one or more of the same, and/or any other suitable power source.

In some examples, light-emitting device 110 may include and/or represent any type or form of device capable of emitting light for illuminating a visual display. In one example, light-emitting device 110 may include and/or represent one or more laser diodes. Additional examples of light-emitting device 110 include, without limitation, pixels, laser projectors, Light-Emitting Diodes (LEDs), Organic LEDS (OLEDs), Liquid Crystal Displays (LCDs), combinations or variations of one or more of the same, and/or any other suitable light-emitting device. As illustrated in FIG. 1, an anode of light-emitting device 110 may be electrically coupled to buck driver circuit 106, and a cathode of light-emitting device 110 may be electrically coupled to a ground node.

Figure 2:
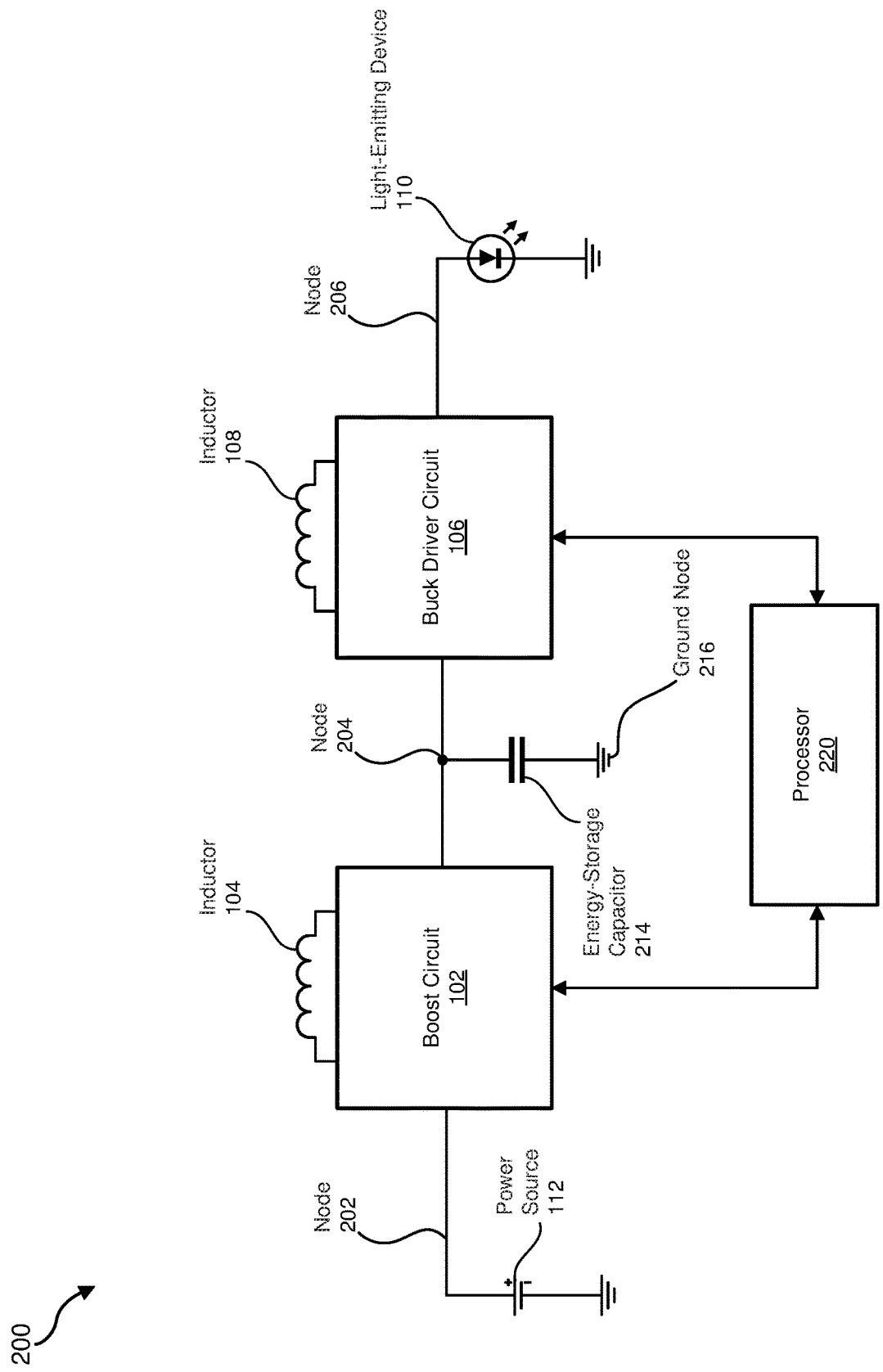
FIG. 2 is an illustration of an additional exemplary apparatus for efficiently driving visual displays via light-emitting devices.

FIG. 2 illustrates an exemplary apparatus 200 that efficiently drives visual displays via light-emitting devices. In some examples, apparatus 200 may include and/or represent a combination of boost circuit 102 and buck driver circuit 106 that are electrically coupled to one another via a node 204. In such examples, apparatus 200 may include and/or incorporate an energy-storage capacitor 214 that is electrically coupled between node 204 and a ground node 216. Additionally or alternatively, apparatus 200 may include and/or incorporate light-emitting device 110, which is electrically coupled to buck driver circuit 106 via a node 206. Further, apparatus 200 may include and/or incorporate power source 112, which is electrically coupled to boost circuit 102 via a node 202.

Energy-storage capacitor 214 may be of various shapes, sizes, and/or dimensions. In one example, energy-storage capacitor 214 may be a rectangular surface-mount component with a 3.2 mm×1.6 mm footprint. Additionally or alternatively, energy-storage capacitor 214 may be a rectangular surface-mount component with a 3.5 mm×2.8 mm footprint.

Energy-storage capacitor 214 may exhibit and/or have any of a variety or range of capacitance values. In one example, energy-storage capacitor 214 may exhibit and/or have a capacitance value of 22 microfarads (uF). Additionally or alternatively, energy-storage capacitor 214 may exhibit and/or have a capacitance value of 33 uF.

As illustrated in FIG. 2, apparatus 200 may also include and/or incorporate processor 220. In some examples, processor 220 may represent any type or form of hardware-implemented processing device capable of interpreting and/or executing computer-readable instructions. In one example, processor 220 may interface with boost circuit 102 and/or buck driver circuit 106. For example, and as will be described in greater detail below, processor 220 may intake and/or receive certain signals as inputs from boost circuit 102 and/or buck driver circuit 106. Additionally or alternatively, processor 220 may provide and/or deliver certain signals as outputs to boost circuit 102 and/or buck driver circuit 106. Examples of processor 220 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 3:
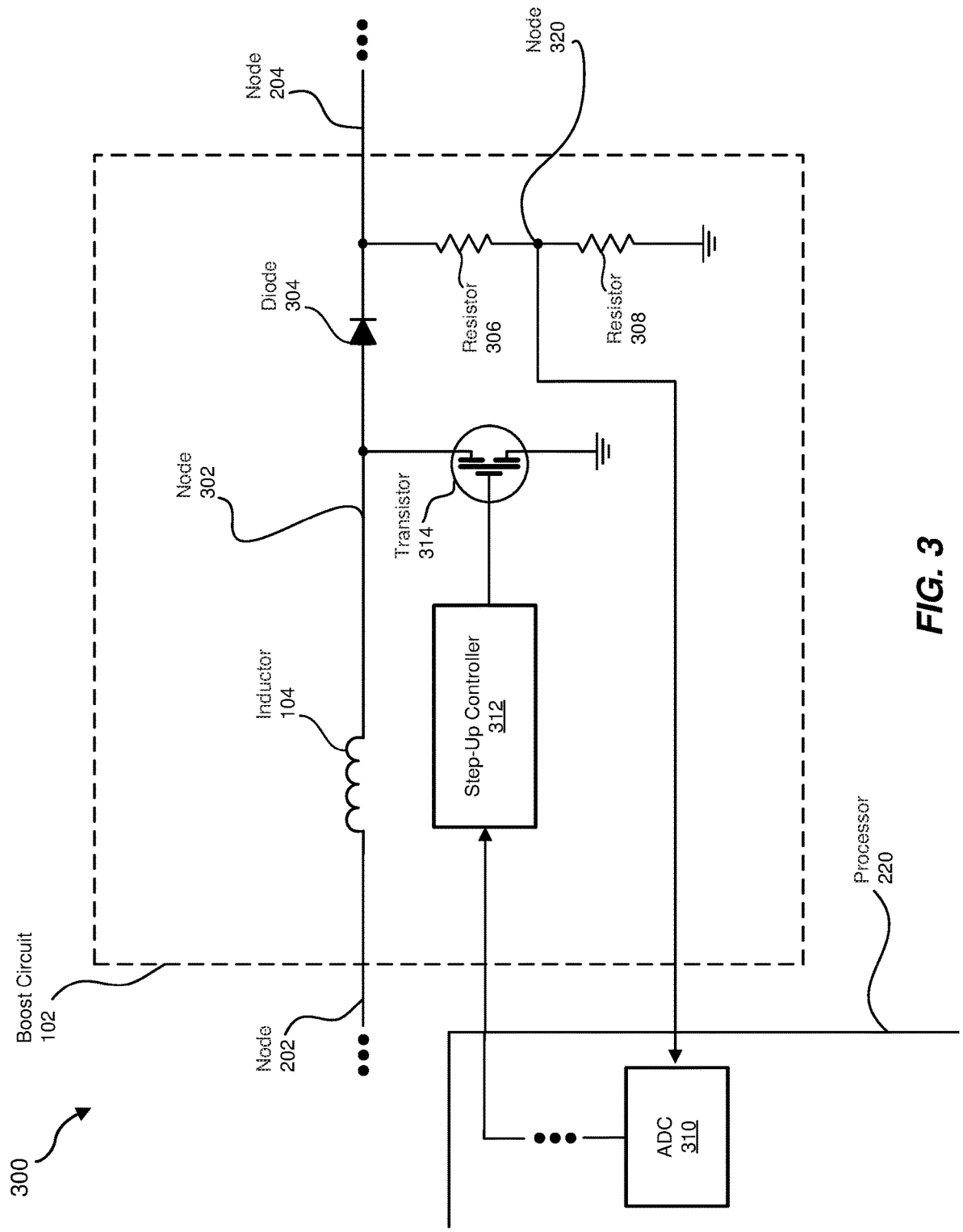
FIG. 3 is an illustration of an exemplary boost circuit that is electrically coupled between a buck driver circuit and a power source.

FIG. 3 illustrates an exemplary apparatus 300 that includes a certain implementation of boost circuit 102 that forms part of a buck-boost converter for efficiently driving visual displays via light-emitting devices. In some examples, boost circuit 102 may include and/or represent various components. For example, boost circuit 102 may include and/or incorporate a transistor 314, a step-up controller 312, an Analog-to-Digital Converter (ADC) 310, a resistor 306, a resistor 308, a diode 304, and/or inductor 104. In this example, inductor 104 may be electrically coupled between node 202 and a node 302.

Continuing with this example, transistor 314 may be electrically coupled to node 302, step-up controller 312, and a ground node. In one example, the gate of transistor 314 may be electrically coupled to step-up controller 312. In this example, the source of transistor 314 may be electrically coupled to node 302, and the drain of transistor 314 may be electrically coupled to a ground node. Alternatively, the drain of transistor 314 may be electrically coupled to node 302, and the source of transistor 314 may be electrically coupled to the ground node.

Transistor 314 may be any type or form of transistor device. In one example, transistor 314 may be a Metal Oxide Semiconductor Field Effect Transistor (MOSFET). Additional examples of transistor 314 include, without limitation, Bipolar Junction Transistors (BJTs), Junction gate Field Effect Transistors (JFETs), insulated-gate bipolar transistors (IGBTs), combinations or variations of one or more of the same, and/or any other suitable transistors.

As illustrated in FIG. 3, diode 304 may be electrically coupled between node 302 and node 204. In some examples, a voltage divider may be coupled between node 204 and a ground node. For example, the voltage divider may include and/or represent resistors 306 and 308, which are electrically coupled to one another at node 320. In this example, a feedback loop may be formed, constructed, and/or assembled between node 320 and the gate of transistor 314.

In some examples, the feedback loop may include and/or represent ADC 310 and/or step-up controller 312 electrically coupled to one another. In one example, ADC 310 may be included in and/or represent part of processor 220. Alternatively, and although not illustrated in this way in FIG. 3, ADC 310 may constitute and/or represent a stand-alone device and/or circuit external to processor 220. In this example, ADC 310 may deliver its output to processor 220 for further processing and/or decision-making or directly to step-up controller 312. Either way, step-up controller 312 may be electrically coupled between ADC 310 and the gate of transistor 314. Additionally or alternatively, ADC 310 may be electrically coupled between step-up controller 312 and node 320.

In some examples, the output of ADC 310 may be directed and/or delivered to step-up controller 312. In one example, the output of ADC 310 may constitute and/or represent a digital wave and/or signal whose frequency is dependent upon and/or commensurate with the current or voltage level sensed at node 320. In this example, step-up controller 312 may be configured to bolster the charge delivered to the gate of transistor 314 and/or drive the switching of transistor 314 via the digital wave and/or signal. Additionally or alternatively, processor 220 may modify and/or tailor the frequency of the digital wave and/or signal delivered to step-up controller 312 to achieve a certain current level outputted by boost circuit 102 via node 204.

In some examples, boost circuit 102 may be a digital boost circuit. In one example, digital boost may be able to maintain and/or keep electric current near and/or close to pure DC. In this example, digital boost may function and/or operate at a relatively low frequency (e.g., approximately 100 kilohertz). The low frequency switching of the digital boost may achieve and/or facilitate higher efficiency boost than an analog circuit. In addition, the digital boost may mitigate and/or eliminate the need for calibration and/or chip testing.

Although FIG. 3 illustrates one exemplary implementation of boost circuit 102, various other implementations and/or topologies of boost circuit 102 may alternatively be applied to apparatus 300. For example, one or more of the components illustrated in FIG. 3 may be replaced with one or more alternative components that perform and/or provide a similar functionality. In another example, apparatus 300 may include and/or incorporate one or more additional components that are not illustrated in FIG. 3. In a further example, apparatus 300 may exclude and/or omit one or more components that are illustrated in FIG. 3.

In some examples, processor 220 may control and/or modify the operation of boost circuit 102, thereby controlling and/or modifying the operation of buck driver circuit 106 and/or light-emitting device 110. For example, buck driver circuit 106 may pull and/or draw the electric current from energy-storage capacitor 214 at node 204 to facilitate delivering a pulse to light-emitting device 110 via node 206. In this example, as the electric current drops at node 204, boost circuit 102 may pull and/or draw additional electric current in an attempt to reach and/or achieve regulation, steady state, and/or equilibrium.

In one example, as the output of boost circuit 102 is brought low, processor 220 may change the frequency of operation of boost circuit 102 by dithering the gate of transistor 314 via the step-up controller 312. As a result of these frequency changes, boost circuit 102 may be able to keep and/or maintain the average level of electric current outputted via node 204 relatively constant even as buck driver circuit 106 delivers pulses of electric current to light-emitting device 110. In other words, when the voltage at node 204 returns to a certain level, processor 220 may change the frequency of operation of boost circuit 102 such that the inrush current outputted to energy-storage capacitor 214 remains relatively constant despite the pulling of electric current from node 204 and/or the delivery of regular pulses of electric current to light-emitting device 110. Additionally or alternatively, by changing the frequency of operation of boost circuit 102 in this way, processor 220 may be able to smooth out any current transients that would otherwise appear and/or result in the output of boost circuit 102.

In some examples, the duty cycle of the electric pulses delivered to light-emitting device 110 may be low and/or short with respect to the recovery time of boost circuit 102. Because, in such examples, the duty cycle of the electric pulses is so low and/or short, boost circuit 102 may have enough time to catch up and/or return to regulation, steady state, and/or equilibrium (e.g., at transistor 314).

In some examples, processor 220 may sense and/or measure the voltage level of node 320 between resistors 306 and 308. In one example, processor 220 receive an input signal representative of the voltage level of node 320 within boost circuit 102 via ADC 310. In this example, processor 220 may generate and/or produce a digital waveform commensurate with that voltage level via ADC 310. Processor 220 may then provide and/or deliver the digital waveform to step-up controller 312 for driving the switching regulator (e.g., transistor 314) of boost circuit 102.

In some examples, processor 220 may change and/or modify a feature of the digital waveform to increase or decrease the amount of electric current that passes through the switching regulator of boost circuit 102. In one example, this feature may include and/or represent the duty cycle of the digital waveform. Additionally or alternatively, this feature may include and/or represent the frequency of the digital waveform.

In some examples, processor 220 may be able to sufficiently control and/or modify the operation of boost circuit 102 and/or buck driver circuit 106 such that apparatus 300 is able to provide the correct current output to light-emitting device 110 without the use of and/or need for energy-storage capacitor 214. For example, although not illustrated in this way in FIG. 2, apparatus 200 may be able to operate and/or function properly without energy-storage capacitor 214. In this example, processor 220 may change the frequency of operation of boost circuit 102 and/or buck driver circuit 106 to synchronize the needs and/or functions of boost circuit 102 and buck driver circuit 106 relative to one another. As a result, processor 220 may enable apparatus 300 to facilitate that passage and/or flow of sufficient electric current through boost circuit 102 and/or buck driver circuit 106 without energy-storage capacitor 214.

Figure 4:
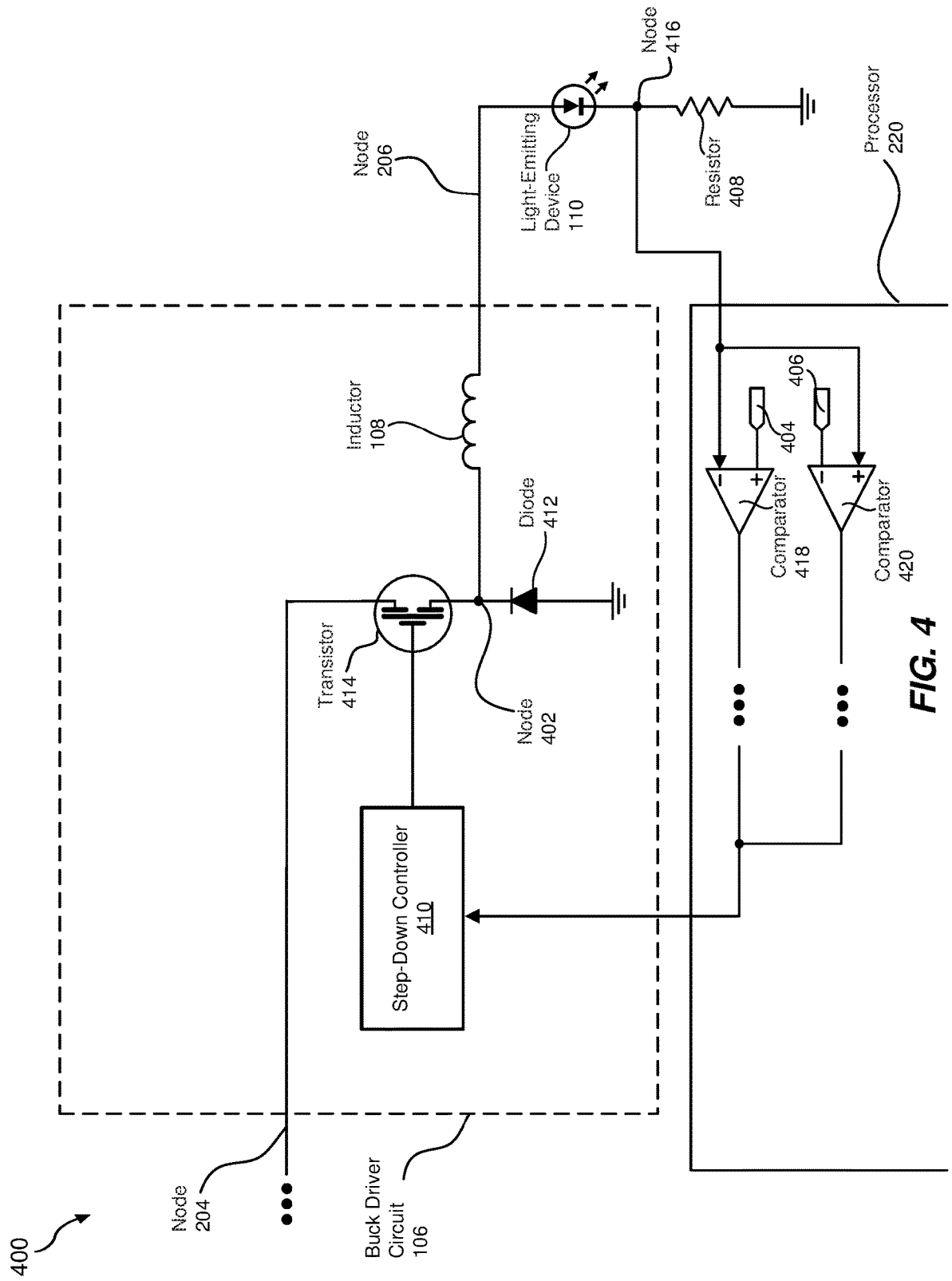
FIG. 4 is an illustration of an exemplary buck driver circuit that is electrically coupled between a boost circuit and a light-emitting device.

FIG. 4 illustrates an exemplary apparatus 400 that includes a certain implementation of buck driver circuit 106 that forms part of a buck-boost converter for efficiently driving visual displays via light-emitting devices. In some examples, buck driver circuit 106 may include and/or represent various components. For example, buck driver circuit 106 may include and/or incorporate a transistor 414, a step-down controller 410, comparators 418 and 420, a diode 412, and/or inductor 108. In this example, inductor 108 may be electrically coupled between node 206 and a node 402.

Continuing with this example, transistor 414 may be electrically coupled to node 204, node 402, and step-down controller 410. In one example, the gate of transistor 414 may be electrically coupled to step-down controller 410. In this example, the source of transistor 414 may be electrically coupled to node 204, and the drain of transistor 414 may be electrically coupled to node 402. Alternatively, the drain of transistor 414 may be electrically coupled to node 204, and the source of transistor 414 may be electrically coupled to node 402. Transistor 414 may be any type or form of transistor device, including any of those described above in connection with transistor 314.

As illustrated in FIG. 4, diode 412 may be electrically coupled between node 402 and a ground node. In one example, inductor 108 may be electrically coupled between node 402 and node 206. In this example, light-emitting device 110 may be electrically coupled between node 206 and a node 416. Additionally or alternatively, a resistor 408 may be electrically coupled between node 416 and a ground node.

In some examples, a feedback loop may be formed, constructed, and/or assembled between node 416 and the gate of transistor 414. In one example, the feedback loop may include and/or represent comparators 418 and 420 as well as step-down controller 410. In one example, comparators 418 and 420 may be included in and/or represent part of processor 220. Alternatively, and although not illustrated in this way in FIG. 4, comparators 418 and 420 may constitute and/or represent one or more stand-alone devices and/or circuits external to processor 220. In this example, comparators 418 and 420 may provide and/or deliver the resulting output to processor 220 for further processing and/or decision-making or directly to step-down controller 410.

Either way, one input of comparator 418 and one input of comparator 420 may each be electrically coupled to node 416. Another input of comparator 418 may be electrically coupled to a maximum reference voltage 404, and another input of comparator 420 may be electrically coupled to a minimum reference voltage 406. Accordingly, maximum reference voltage 404 may limit and/or set the maximum peak of the pulse-width modulated signal output to the gate of transistor 414, and minimum reference voltage 406 may limit and/or set the minimum peak of the pulse-width modulated signal output to the gate of transistor 414.

In some example, the output(s) of one or more of comparators 418 and 420 may be directed and/or delivered to step-down controller 410. In one example, the output(s) of one or more of comparators 418 and 420 may constitute and/or represent a digital wave and/or signal whose frequency is dependent upon and/or commensurate with the current or voltage level sensed at node 416. In this example, step-down controller 410 may be configured to bolster the charge delivered to the gate of transistor 414 and/or drive the switching of transistor 414 via the digital wave and/or signal. Additionally or alternatively, processor 220 may modify and/or tailor the frequency of the digital wave and/or signal delivered to step-down controller 410 to achieve a certain current level outputted by buck driver circuit 106 via node 206.

Continuing with this example, the output of comparator 418 and the output of comparator 420 may each be electrically coupled to step-down controller 410. Accordingly, step-down controller 410 may be electrically coupled between the gate of transistor 414 and the outputs of comparators 418 and 420.

Although FIG. 4 illustrates one exemplary implementation of buck driver circuit 106, various other implementations and/or topologies of buck driver circuit 106 may alternatively be applied to apparatus 400. For example, one or more of the components illustrated in FIG. 4 may be replaced with one or more alternative components that perform a similar functionality. In another example, apparatus 400 may include and/or incorporate one or more additional components that are not illustrated in FIG. 4. In a further example, apparatus 400 may exclude and/or omit one or more components that are illustrated in FIG. 4.

As a specific example, comparators 418 and 420 may be replaced by an ADC (similar to ADC 310 in FIG. 3). Additionally or alternatively, diode 412 may be replaced by a FET transistor for synchronous regulation. In a further example, instead of originating from node 416, the feedback loop of buck driver circuit 106 may alternatively originate from node 206 such that the current level is sensed at the anode of light-emitting device 110.

Figure 5:
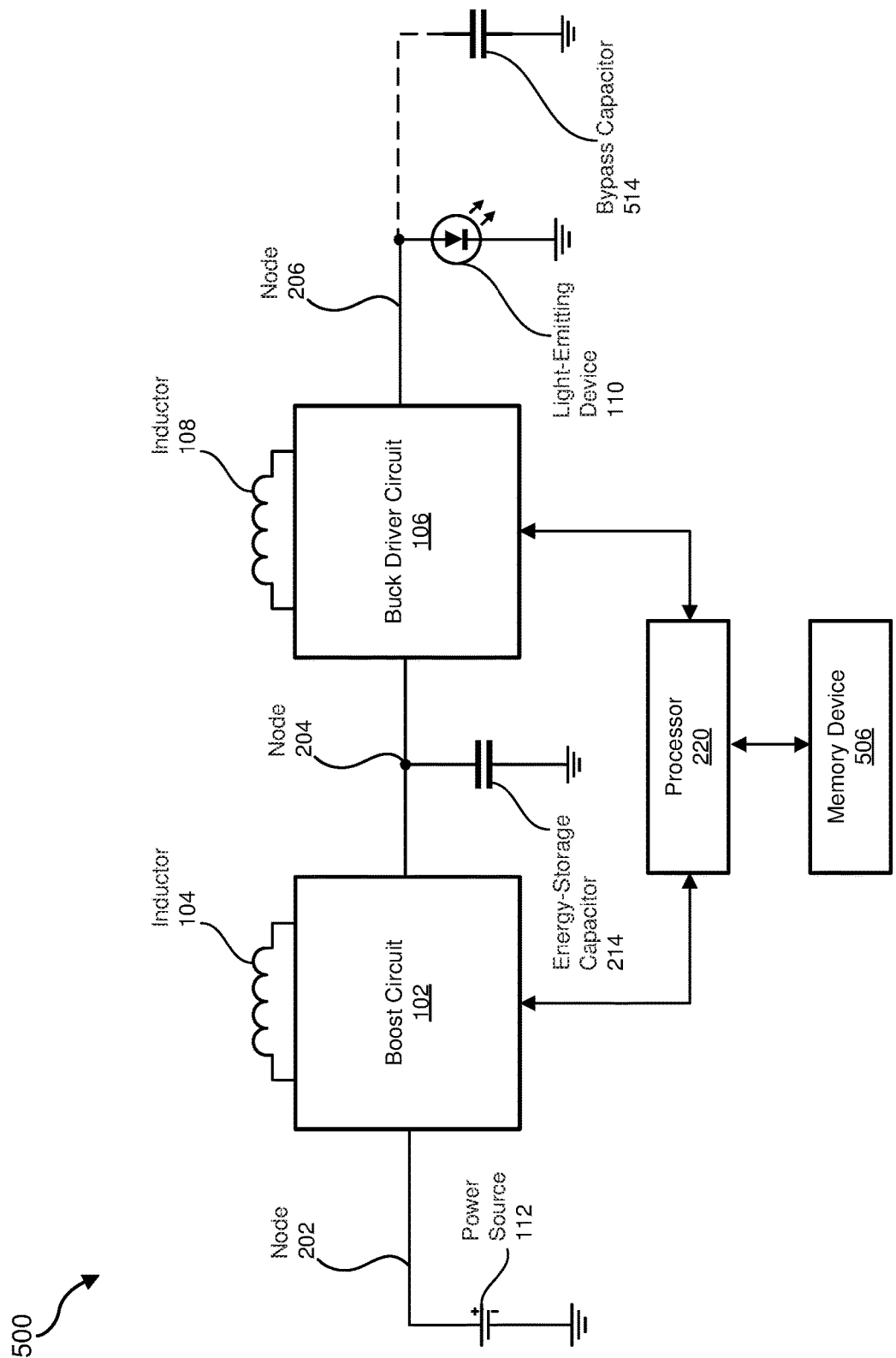
FIG. 5 is an illustration of an exemplary system for efficiently driving visual displays via light-emitting devices.

FIG. 5 illustrates an exemplary system 500 that efficiently drives visual displays via light-emitting devices. As illustrated in FIG. 5, system 500 may include and/or represent a combination of boost circuit 102 and buck driver circuit 106 that are electrically coupled to one another via node 204. In some examples, system 500 may include and/or incorporate an energy-storage capacitor 214 that is electrically coupled between node 204 and a ground node. Additionally or alternatively, system 500 may include and/or incorporate light-emitting device 110, which is electrically coupled to buck driver circuit 106 via node 206. Further, system 500 may include and/or incorporate power source 112, which is electrically coupled to boost circuit 102 via node 202.

As illustrated in FIG. 5, system 500 may also include and/or incorporate processor 220 and/or a memory device 506. In some examples, memory device 506 may represent any type or form of volatile or non-volatile storage device or medium capable of storing data and/or computer-readable instructions. In one example, memory device 506 may store, load, and/or maintain one or more software modules that facilitate tracking, monitoring, and/or logging temperature data and/or aging data in connection with light-emitting device 110. Additionally or alternatively, memory device 506 may store, save, and/or preserve such temperature data and/or aging data in connection with light-emitting device 110. Examples of memory device 506 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some examples, processor 220 may represent any type or form of hardware-implemented processing device capable of interpreting and/or executing computer-readable instructions. In one example, processor 220 may access and/or modify one or more of the software modules stored in memory 506. Additionally or alternatively, processor 220 may execute one or more of the software modules to facilitate efficiently driving visual displays via light-emitting devices. In another example, processor 220 may create, access, and/or modify the aging data and/or temperature data stored in memory 506. Examples of processor 220 include, without limitation, Central Processing Units (CPUs), microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

In one example, processor 220 may analyze and/or evaluate the aging data and/or temperature data stored in memory device 506. In this example, processor 220 may then program and/or configure buck driver circuit 106 such that buck driver circuit 106 dynamically adjusts the output provided to light-emitting device 110 based at least in part on the aging data and/or the temperature data. For example, processor 220 may determine and/or estimate the voltage and/or amount of electric current needed by light-emitting device 110 to achieve and/or produce a certain visual result based at least in part on the aging data and/or the temperature data. In this example, processor 220 may then program and/or configure buck driver circuit 106 to output that voltage and/or amount of electric current to light-emitting device 110 via node 206.

As illustrated in FIG. 5, system 500 and/or buck driver circuit 106 may optionally include and/or incorporate a bypass capacitor 514 that runs parallel with light-emitting device 110. For example, bypass capacitor 514 may be electrically coupled between node 206 and a ground node in system 500 and/or buck driver circuit 106. However, system 500 and/or buck driver circuit 106 may alternatively exclude and/or omit bypass capacitor 514 such that no bypass capacitor is applied between node 206 and a ground node.

Figure 6:
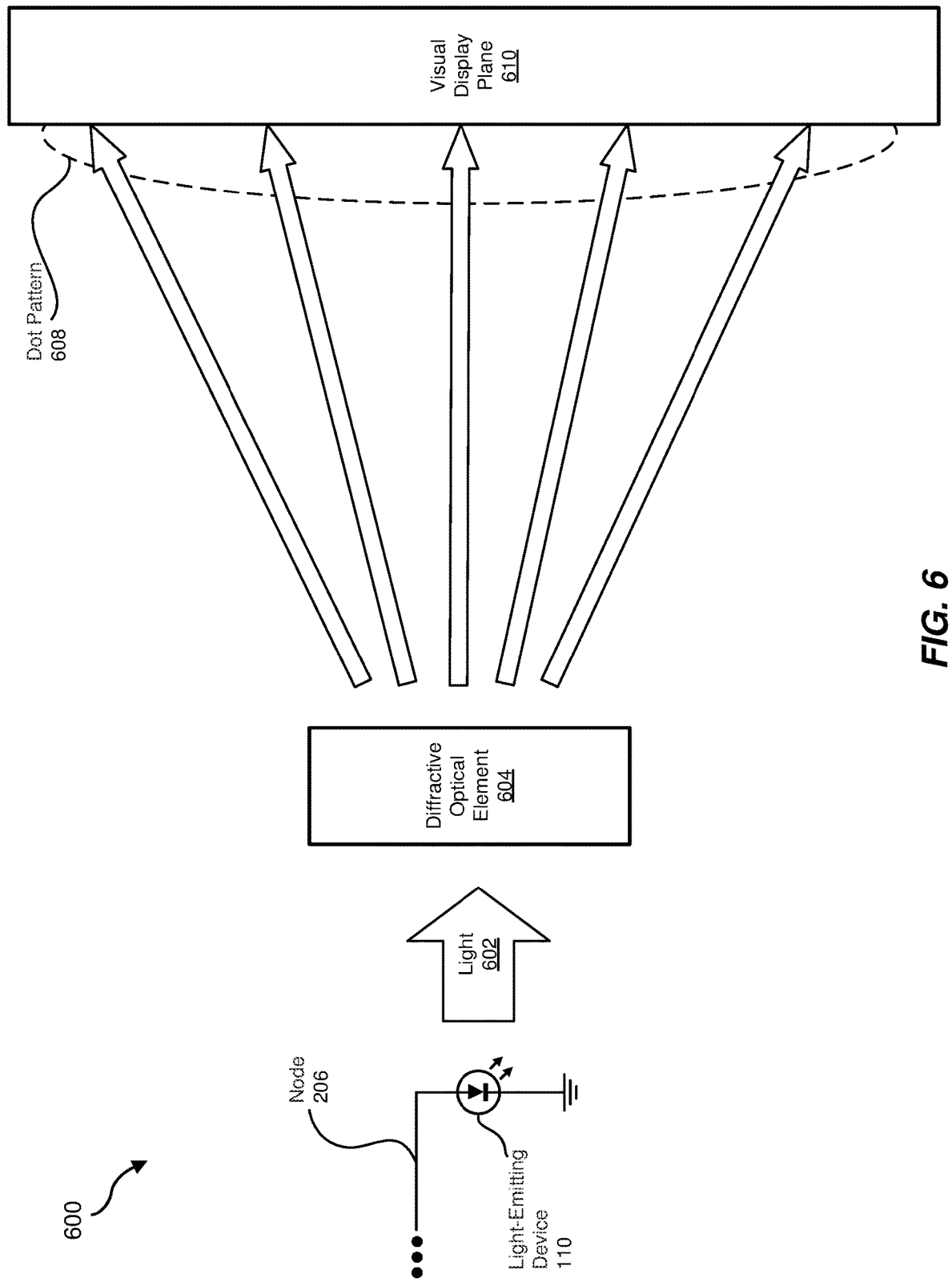
FIG. 6 is an illustration of an additional exemplary system for efficiently driving visual displays via light-emitting devices.

FIG. 6 illustrates an exemplary system 600 that efficiently drives visual displays via light-emitting devices. As illustrated in FIG. 6, system 600 may include and/or represent a diffractive optical element 604 that diffracts and/or manipulates light 602 projected and/or emitted by light-emitting device 110. In one example, system 600 may be incorporated into and/or implemented by a head-mounted display worn by a user of an artificial reality system (such as a virtual reality system, augmented reality system, mixed reality system, and/or hybrid reality system). In this example, by diffracting and/or manipulating light 602, diffractive optical element 604 may form and/or produce a dot pattern 608 for visual presentation to the user of the artificial reality system via the head-mounted display. Diffractive optical element 604 may project and/or cast dot pattern 608 onto and/or against a visual display plane 610 positioned within the head-mounted display for viewing by the user.

Dot pattern 608 may include and/or represent a variety of different patterns and/or visual presentation schemes. Examples of dot pattern 608 include, without limitation, line patterns, hatching patterns, crosshatching patterns, dot schemes, geometric shape patterns, grid patterns, symmetric dot patterns, quasi-random dot patterns, horizontal bar patterns, combinations or variations of one or more of the same, and/or any other suitable dot pattern.

Figure 7:
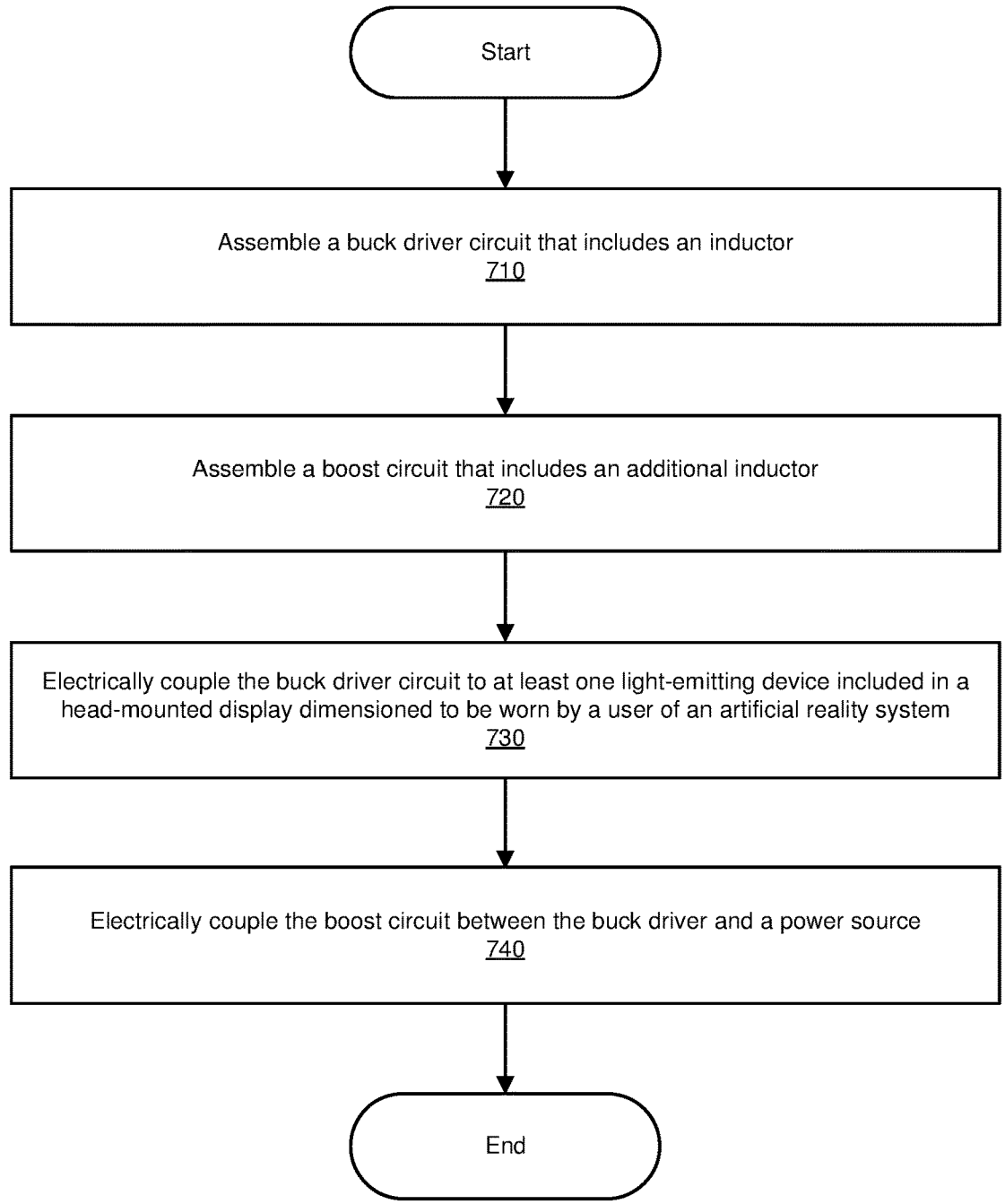
FIG. 7 is a flowchart of an exemplary method for efficiently driving visual displays via light-emitting devices.

FIG. 7 is a flow diagram of an exemplary method 700 for efficiently driving visual displays via light-emitting devices. In one example, the steps shown in FIG. 7 may be performed as part of manufacturing and/or assembling a buck-boost converter for efficiently driving a visual display. Additionally or alternatively, the steps shown in FIG. 7 may also incorporate and/or involve various sub-steps and/or variations consistent with the descriptions provided above in connection with FIGS. 1-6.

As illustrated in FIG. 7, method 700 may include a step 710 in which a buck driver circuit that includes an inductor is assembled. In one example, a computing equipment manufacturer or subcontractor may create, construct, and/or assemble a buck driver circuit that includes its own inductor. For example, the computing equipment manufacturer or subcontractor may solder various electrical components to a circuit board. In this example, the soldered electrical components may form and/or represent a buck driver circuit designed to step down an input voltage and then feed the stepped-down voltage to at least one light-emitting device of a visual display.

As illustrated in FIG. 7, method 700 may also include a step 720 in which a boost circuit that includes an additional inductor is assembled. In one example, the computing equipment manufacturer or subcontractor may create, construct, and/or assemble a boost circuit that includes its own inductor. For example, the computing equipment manufacturer or subcontractor may solder various additional electrical components to the circuit board. In this example, the additional soldered electrical components may form and/or represent a boost circuit designed to step up an input voltage and then feed the stepped-up voltage to the buck driver circuit before being outputted to the light-emitting device of the visual display.

As illustrated in FIG. 7, method 700 may also include a step 730 in which the buck driver circuit is electrically coupled to at least one light-emitting device included in a head-mounted display dimensioned to be worn by a user of an artificial reality system. In one example, the computing equipment manufacturer or subcontractor may create, construct, and/or assemble an electrical coupling between the buck driver circuit and the light-emitting device. For example, the computing equipment manufacturer or subcontractor may solder the output of the buck driver circuit to the anode of the light-emitting device via a conductive trace included on the circuit board. In this example, the conductive trace included on the circuit board may enable the buck driver circuit to feed and/or deliver electric current to the light-emitting device.

As illustrated in FIG. 7, method 700 may also include a step 740 in which the boost circuit is electrically coupled between the buck driver circuit and a power source. In one example, the computing equipment manufacturer or subcontractor may create, construct, and/or assemble an electrical coupling between the boost circuit and the power source. For example, the computing equipment manufacturer or subcontractor may solder the input of the boost circuit to a power source via a conductive trace included on the circuit board. In this example, the conductive trace included on the circuit board may enable the power source to feed and/or deliver electric current to the boost circuit before being outputted to the buck driver circuit.

As described above in connection with FIGS. 1-7, a buck-boost converter may be able to efficiently drive visual displays via light-emitting devices. In one example, a 3D laser illuminator and/or projector may include and/or implement a buck-boost converter with a compact footprint. This buck-boost converter may include and/or represent a combination of a digital step-up converter and a capacitor-less step-down converter. In this example, the buck-boost converter may include and/or incorporate an energy-storage capacitor between the boost and buck circuitry. The buck-boost converter may exclude and/or omit large bypass capacitors often applied in parallel with the light-emitting devices of traditional visual displays, thereby reducing the overall footprint of the 3D laser illuminator and/or projector as well as decreasing the equipment and/or manufacturing costs.

In one example, the 3D laser illuminator and/or projector may efficiently drive 3D depth sensing for a head-mounted display of an artificial reality system. In this example, the 3D laser illuminator and/or projector may mitigate and/or resolve the potential for brownout during operation of the head-mounted display. Additionally or alternatively, the 3D laser illuminator and/or projector may increase the overall efficiency from the power source (e.g., a battery) to the light-emitting device (e.g., a laser).

EXAMPLE EMBODIMENTS

Example 1: An apparatus comprising (1) at least one light-emitting device, (2) a buck driver circuit electrically coupled to the light-emitting device, wherein the buck driver circuit includes an inductor, and (3) a boost circuit electrically coupled between the buck driver circuit and a power source, wherein the boost circuit includes an additional inductor.

Example 2: The apparatus of Example 1, further comprising (1) a node that electrically couples the buck driver circuit and the boost circuit to one another and (2) an energy-storage capacitor that is electrically coupled between the node and a ground node.

Example 3: The apparatus of Example 1, wherein the buck driver circuit is directly coupled to the light-emitting device via the inductor.

Example 4: The apparatus of Example 1, wherein the buck driver circuit excludes a bypass capacitor that runs parallel with the light-emitting device.

Example 5: The apparatus of Example 1, wherein the buck driver circuit includes a bypass capacitor that runs parallel with the light-emitting device.

Example 6: The apparatus of Example 1, wherein the light-emitting device comprises at least one of (1) at least one laser diode, (2) a laser projector, or (3) at least one pixel.

Example 7: The apparatus of Example 1, wherein the boost circuit comprises a digital boost circuit.

Example 8: The apparatus of Example 7, wherein the digital boost circuit includes a transistor electrically coupled to (1) the inductor, (2) a step-up controller, and (3) a ground node.

Example 9: The apparatus of Example 8, further comprising a node that electrically couples the buck driver circuit and the boost circuit to one another, and wherein the boost circuit comprises an analog-to-digital converter coupled between the node and the step-up controller.

Example 10: The apparatus of Example 1, wherein the buck driver circuit includes a transistor electrically coupled to (1) the boost circuit, (2) a step-up controller, and (3) the additional inductor.

Example 11: The apparatus of Example 10, wherein the buck driver circuit comprises (1) a first comparator that includes (A) a plurality of inputs coupled to (I) an anode of the light-emitting device and (II) a first signal that represents a maximum reference voltage and (B) an output coupled to the step-up controller and (2) a second comparator that includes (A) a plurality of inputs coupled to (I) the anode of the light-emitting device and (II) a second signal that represents a minimum reference voltage and (B) an output coupled to the step-up controller.

Example 12: The apparatus of Example 1, further comprising (1) a memory device that stores at least one of (A) aging data that identifies an age of the light-emitting device; or (B) temperature data that identifies an operating temperature of the light-emitting device; and (2) at least one processor communicatively coupled to the memory device and the buck driver circuit, wherein the processor (A) accesses the aging data or the temperature data from the memory device and (B) programs the buck driver circuit such that the buck driver circuit dynamically adjusts an output provided to the light-emitting device based at least in part on the aging data or the temperature data.

Example 13: The apparatus of Example 1, wherein the light-emitting device is incorporated into a head-mounted display dimensioned to be worn by a user of an artificial reality system, and further comprising at least one diffractive optical element that manipulates light projected by the light-emitting device to form a dot pattern for visual presentation to the user of the artificial reality system via the head-mounted display.

Example 14: The apparatus of Example 13, wherein the dot pattern formed by the diffractive optical element comprises at least one of (1) line patterns, (2) hatching patterns, or (3) crosshatching patterns.

Example 15: A system comprising (1) a visual display that includes at least one light-emitting device, (2) a buck driver circuit electrically coupled to the light-emitting device included in the visual display, wherein the buck driver circuit includes an inductor, and (3) a boost circuit electrically coupled between the buck driver circuit and a power source, wherein the boost circuit includes an additional inductor.

Example 16: The system of Example 15, further comprising (1) a node that electrically couples the buck driver circuit and the boost circuit to one another and (2) an energy-storage capacitor that is electrically coupled between the node and a ground node.

Example 17: The system of Example 15, wherein the buck driver circuit is directly coupled to the light-emitting device via the inductor.

Example 18: The system of Example 15, wherein the buck driver circuit excludes a bypass capacitor that runs parallel with the light-emitting device.

Example 19: The system of claim 15, wherein the buck driver circuit includes a bypass capacitor that runs parallel with the light-emitting device.

Example 20: A method comprising (1) assembling a buck driver circuit that includes an inductor, (2) assembling a boost circuit that includes an additional inductor, (3) electrically coupling the buck driver circuit to at least one light-emitting device included in a head-mounted display dimensioned to be worn by a user of an artificial reality system, and (4) electrically coupling the boost circuit between the buck driver circuit and a power source.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Embodiments of the present disclosure may include or be implemented in conjunction with various types of artificial reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is augmented reality system 800 in FIG. 8. Other artificial reality systems may include an NED that also provides visibility into the real world (e.g., augmented reality system 900 in FIG. 9) or that visually immerses a user in an artificial reality (e.g., virtual reality system 1000 in FIG. 10). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 8:
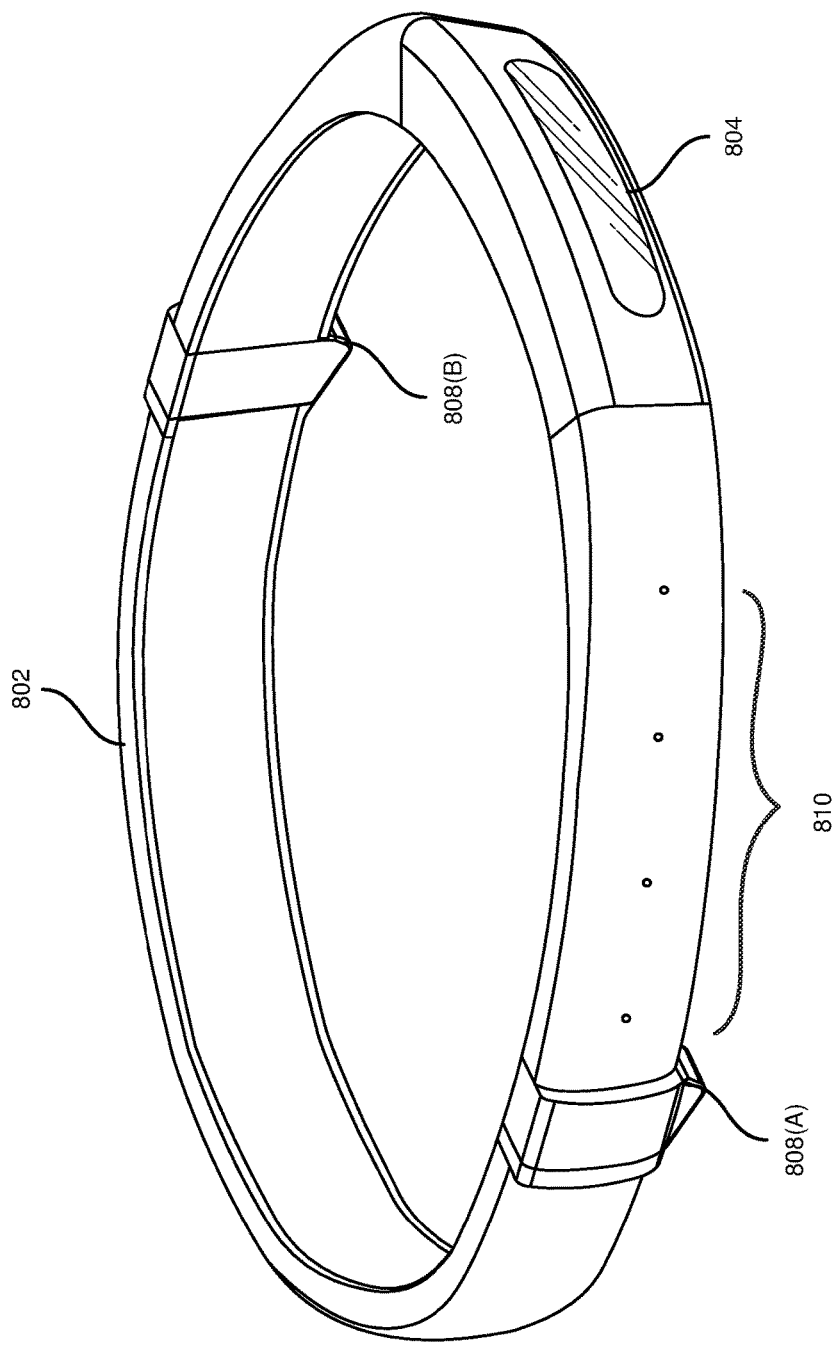
FIG. 8 is an illustration of an exemplary artificial reality headband that may be used in connection with embodiments of this disclosure.

Turning to FIG. 8, augmented reality system 800 generally represents a wearable device dimensioned to fit about a body part (e.g., a head) of a user. As shown in FIG. 8, system 800 may include a frame 802 and a camera assembly 804 that is coupled to frame 802 and configured to gather information about a local environment by observing the local environment. Augmented reality system 800 may also include one or more audio devices, such as output audio transducers 808(A) and 808(B) and input audio transducers 810. Output audio transducers 808(A) and 808(B) may provide audio feedback and/or content to a user, and input audio transducers 810 may capture audio in a user's environment.

As shown, augmented reality system 800 may not necessarily include an NED positioned in front of a user's eyes. Augmented reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented reality system 800 may not include an NED, augmented reality system 800 may include other types of screens or visual feedback devices (e.g., a display screen integrated into a side of frame 802).

Figure 9:
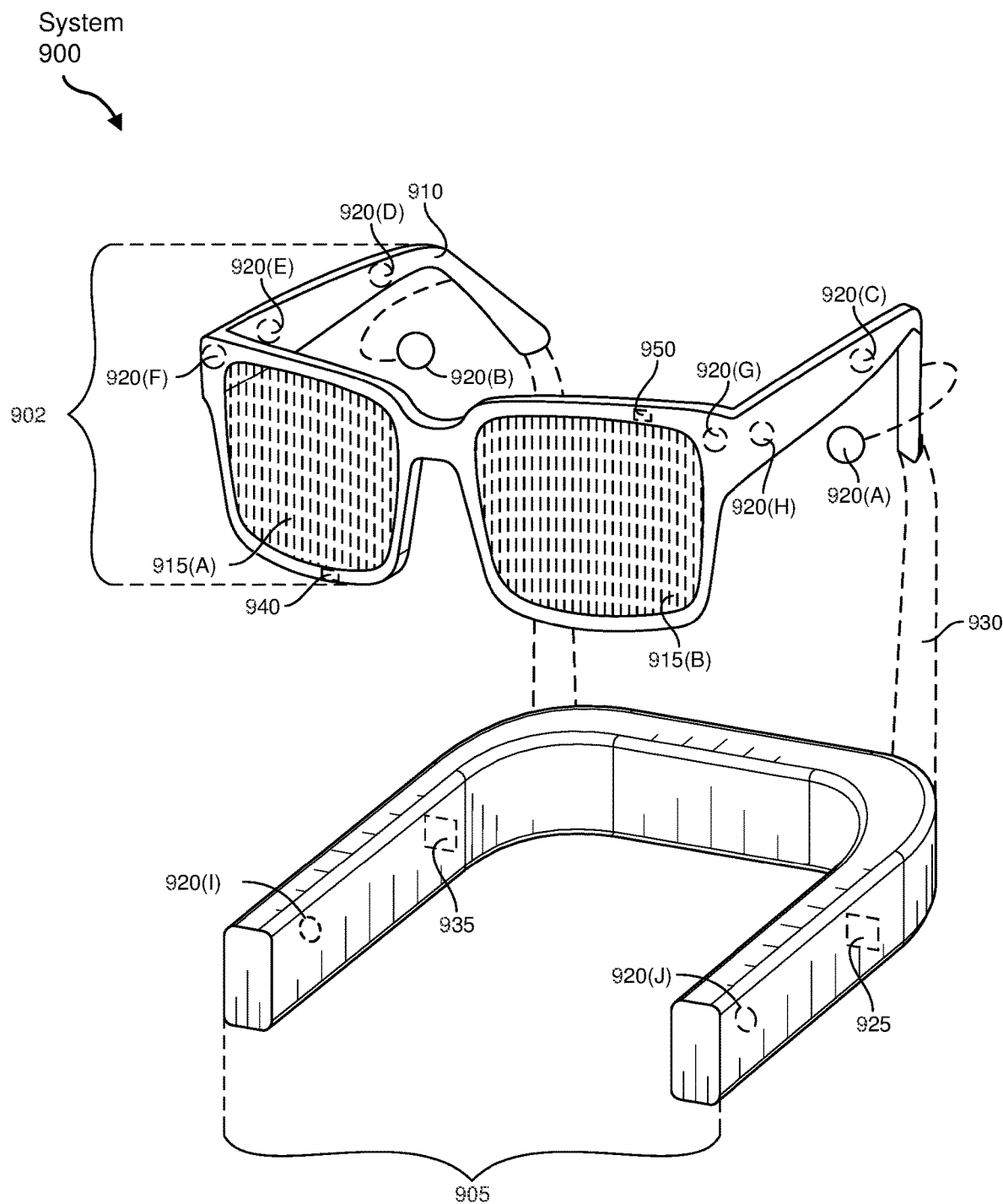
FIG. 9 is an illustration of exemplary augmented reality glasses that may be used in connection with embodiments of this disclosure.

The embodiments discussed in this disclosure may also be implemented in augmented reality systems that include one or more NEDs. For example, as shown in FIG. 9, augmented reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented reality system 900 includes two displays, embodiments of this disclosure may be implemented in augmented reality systems with a single NED or more than two NEDs.

In some embodiments, augmented reality system 900 may include one or more sensors, such as sensor 940. Sensor 940 may generate measurement signals in response to motion of augmented reality system 900 and may be located on substantially any portion of frame 910. Sensor 940 may represent a position sensor, an inertial measurement unit (IMU), a depth camera assembly, or any combination thereof. In some embodiments, augmented reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

Augmented reality system 900 may also include a microphone array with a plurality of acoustic transducers 920(A)-920(J), referred to collectively as acoustic transducers 920. Acoustic transducers 920 may be transducers that detect air pressure variations induced by sound waves. Each acoustic transducer 920 may be configured to detect sound and convert the detected sound into an electronic format (e.g., an analog or digital format). The microphone array in FIG. 2 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(I) and 920(J), which may be positioned on a corresponding neckband 905.

In some embodiments, one or more of acoustic transducers 920(A)-(F) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented reality device 900 may simulate binaural hearing and capture a 3D stereo sound field around about a user's head. In some embodiments, acoustic transducers 920(A) and 920(B) may be connected to augmented reality system 900 via a wired connection 930, and in other embodiments, acoustic transducers 920(A) and 920(B) may be connected to augmented reality system 900 via a wireless connection (e.g., a Bluetooth connection). In still other embodiments, acoustic transducers 920(A) and 920(B) may not be used at all in conjunction with augmented reality system 900.

Acoustic transducers 920 on frame 910 may be positioned along the length of the temples, across the bridge, above or below display devices 915(A) and 915(B), or some combination thereof. Acoustic transducers 920 may be oriented such that the microphone array is able to detect sounds in a wide range of directions surrounding the user wearing the augmented reality system 900. In some embodiments, an optimization process may be performed during manufacturing of augmented reality system 900 to determine relative positioning of each acoustic transducer 920 in the microphone array.

In some examples, augmented reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers and other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented reality eyewear devices may enable the eyewear devices to achieve the form factor of a pair of glasses while still providing sufficient battery and computation power for expanded capabilities. Some or all of the battery power, computational resources, and/or additional features of augmented reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(I) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented reality system 900 includes an inertial measurement unit, controller 925 may compute all inertial and spatial calculations from the IMU located on eyewear device 902. A connector may convey information between augmented reality system 900 and neckband 905 and between augmented reality system 900 and controller 925. The information may be in the form of optical data, electrical data, wireless data, or any other transmittable data form. Moving the processing of information generated by augmented reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial reality systems may, instead of blending an artificial reality with actual reality, substantially replace one or more of a user's sensory perceptions of the real world with a virtual experience. One example of this type of system is a head-worn display system, such as virtual reality system 1000 in FIG. 10, that mostly or completely covers a user's field of view. Virtual reality system 1000 may include a front rigid body 1002 and a band 1004 shaped to fit around a user's head. Virtual reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUs), one or more tracking emitters or detectors, and/or any other suitable device or system for creating an artificial reality experience.

Artificial reality systems may include a variety of types of visual feedback mechanisms. For example, display devices in augmented reality system 900 and/or virtual reality system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented reality system 900 and/or virtual reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented reality system 800, augmented reality system 900, and/or virtual reality system 1000 may include one or more optical sensors, such as two-dimensional (2D) or 3D cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

Figure 10:
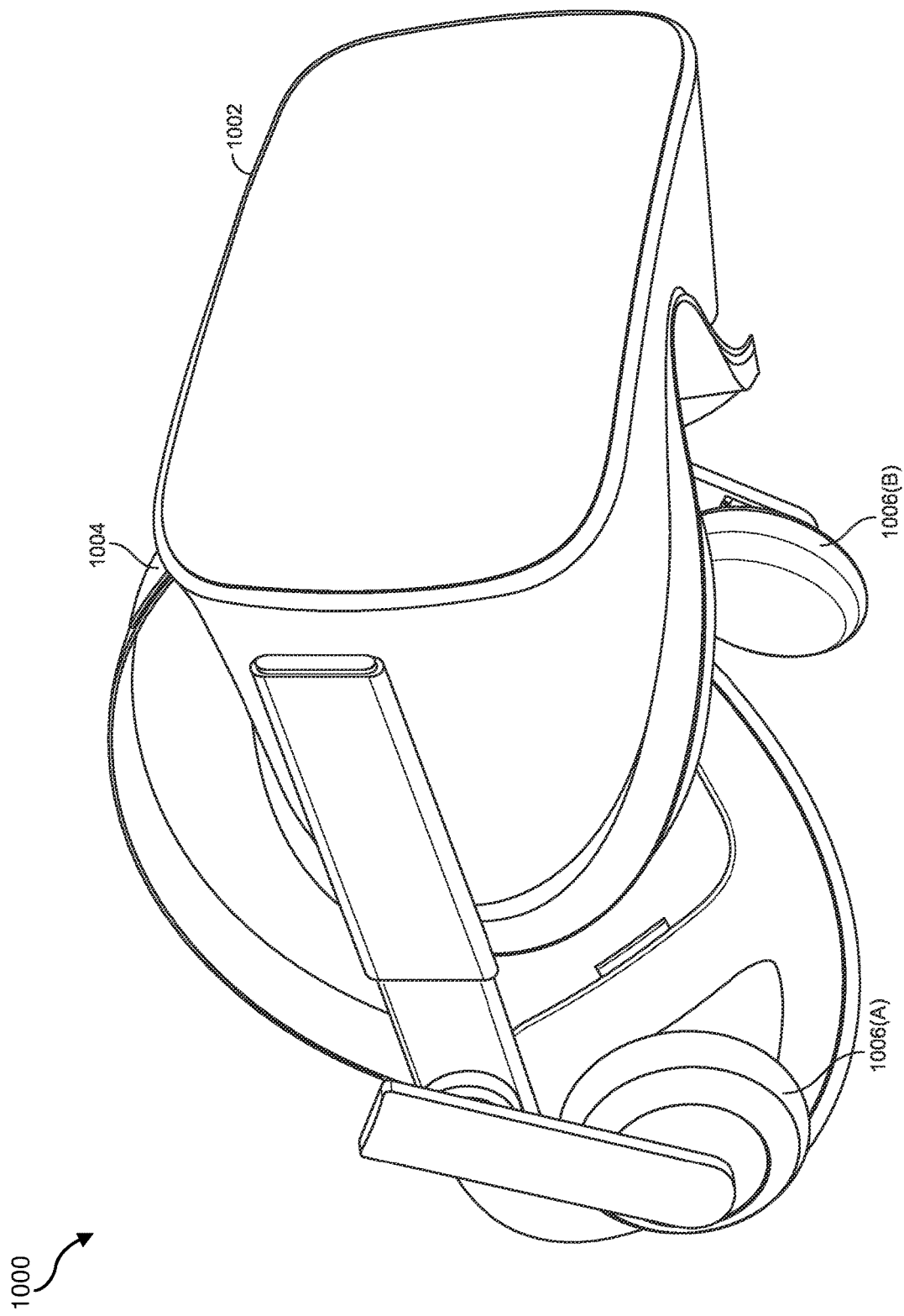
FIG. 10 is an illustration of an exemplary virtual reality headset that may be used in connection with embodiments of this disclosure.

While not shown in FIGS. 8-10, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, artificial reality systems 800, 900, and 1000 may be used with a variety of other types of devices to provide a more compelling artificial reality experience. These devices may be haptic interfaces with transducers that provide haptic feedback and/or that collect haptic information about a user's interaction with an environment. The artificial reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 11:
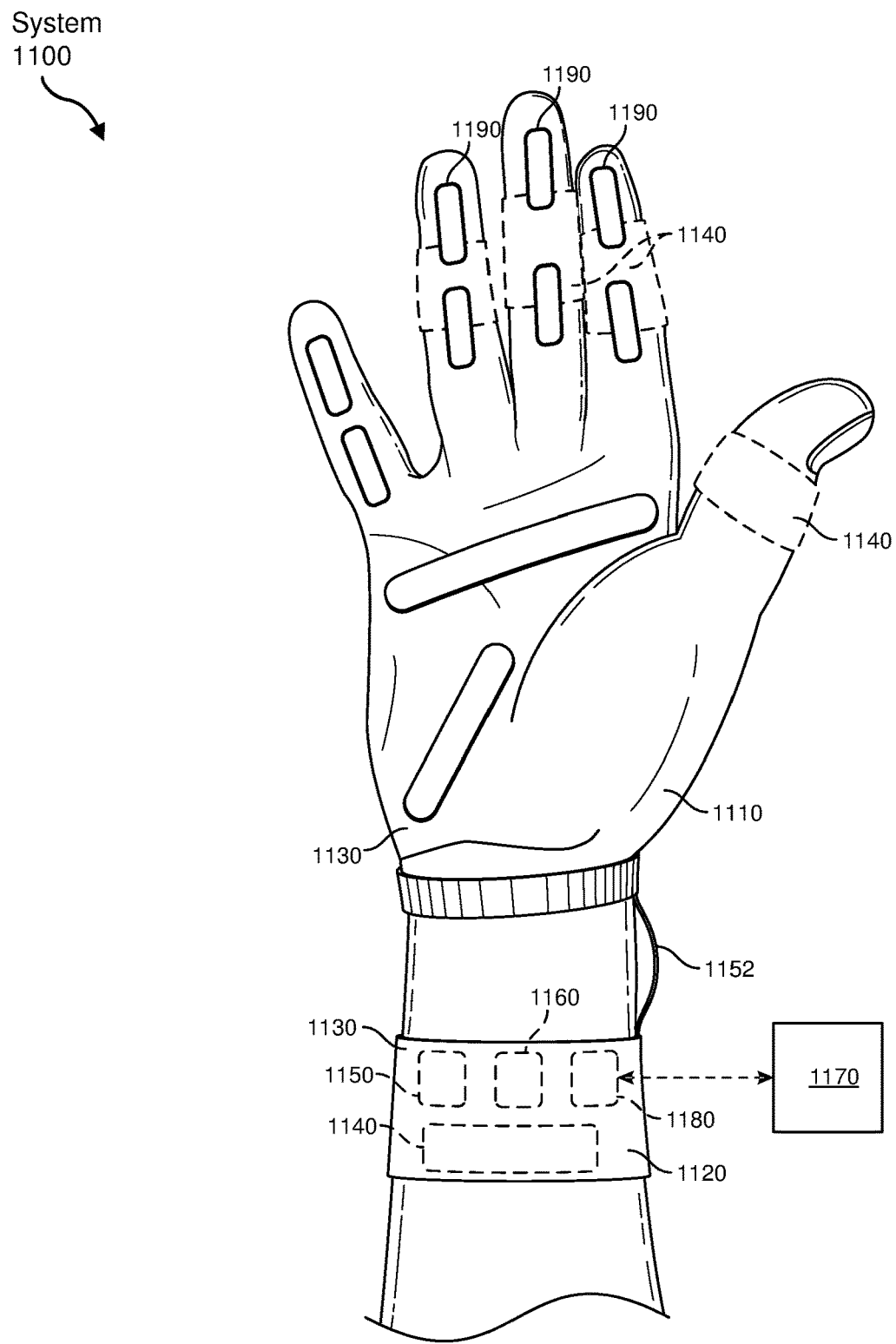
FIG. 11 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 11 illustrates a vibrotactile system 1100 in the form of a wearable glove (haptic device 1110) and wristband (haptic device 1120). Haptic device 1110 and haptic device 1120 are shown as examples of wearable devices that include a flexible, wearable textile material 1130 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1140 may be positioned at least partially within one or more corresponding pockets formed in textile material 1130 of vibrotactile system 1100. Vibrotactile devices 1140 may be positioned in locations to provide a vibrating sensation (e.g., haptic feedback) to a user of vibrotactile system 1100. For example, vibrotactile devices 1140 may be positioned to be against the user's finger(s), thumb, or wrist, as shown in FIG. 11. Vibrotactile devices 1140 may, in some examples, be sufficiently flexible to conform to or bend with the user's corresponding body part(s).

A power source 1150 (e.g., a battery) for applying a voltage to the vibrotactile devices 1140 for activation thereof may be electrically coupled to vibrotactile devices 1140, such as via conductive wiring 1152. In some examples, each of vibrotactile devices 1140 may be independently electrically coupled to power source 1150 for individual activation. In some embodiments, a processor 1160 may be operatively coupled to power source 1150 and configured (e.g., programmed) to control activation of vibrotactile devices 1140.

Vibrotactile system 1100 may be implemented in a variety of ways. In some examples, vibrotactile system 1100 may be a standalone system with integral subsystems and components for operation independent of other devices and systems. As another example, vibrotactile system 1100 may be configured for interaction with another device or system 1170. For example, vibrotactile system 1100 may, in some examples, include a communications interface 1180 for receiving and/or sending signals to the other device or system 1170. The other device or system 1170 may be a mobile device, a gaming console, an artificial reality (e.g., virtual reality, augmented reality, mixed reality) device, a personal computer, a tablet computer, a network device (e.g., a modem, a router, etc.), a handheld controller, etc. Communications interface 1180 may enable communications between vibrotactile system 1100 and the other device or system 1170 via a wireless (e.g., Wi-Fi, Bluetooth, cellular, radio, etc.) link or a wired link. If present, communications interface 1180 may be in communication with processor 1160, such as to provide a signal to processor 1160 to activate or deactivate one or more of the vibrotactile devices 1140.

Vibrotactile system 1100 may optionally include other subsystems and components, such as touch-sensitive pads 1190, pressure sensors, motion sensors, position sensors, lighting elements, and/or user interface elements (e.g., an on/off button, a vibration control element, etc.). During use, vibrotactile devices 1140 may be configured to be activated for a variety of different reasons, such as in response to the user's interaction with user interface elements, a signal from the motion or position sensors, a signal from the touch-sensitive pads 1190, a signal from the pressure sensors, a signal from the other device or system 1170, etc.

Although power source 1150, processor 1160, and communications interface 1180 are illustrated in FIG. 11 as being positioned in haptic device 1120, the present disclosure is not so limited. For example, one or more of power source 1150, processor 1160, or communications interface 1180 may be positioned within haptic device 1110 or within another wearable textile.

Figure 12:
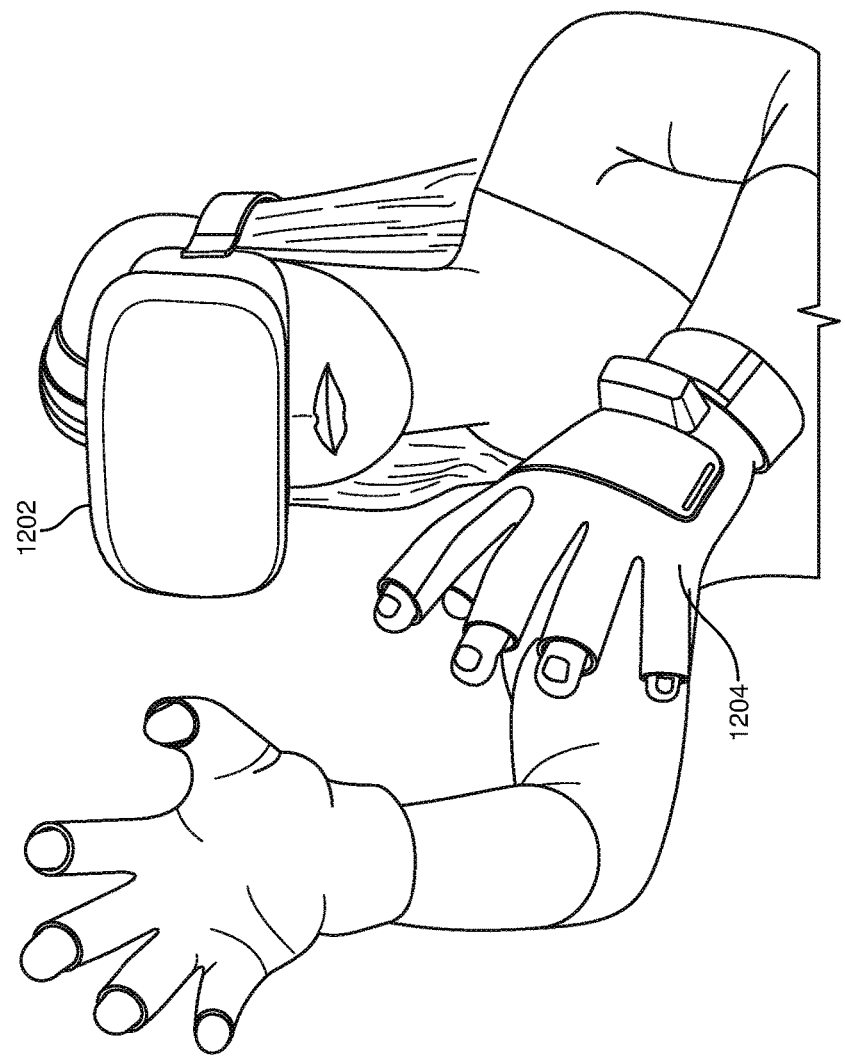
FIG. 12 is an illustration of an exemplary virtual reality environment according to embodiments of this disclosure.

Haptic wearables, such as those shown in and described in connection with FIG. 11, may be implemented in a variety of types of artificial reality systems and environments. FIG. 12 shows an example artificial reality environment 1200 including one head-mounted virtual reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

Head-mounted display 1202 generally represents any type or form of virtual reality system, such as virtual reality apparatus 1000 in FIG. 10. Haptic device 1204 generally represents any type or form of wearable device, worn by a use of an artificial reality system, that provides haptic feedback to the user to give the user the perception that he or she is physically engaging with a virtual object. In some embodiments, haptic device 1204 may provide haptic feedback by applying vibration, motion, and/or force to the user. For example, haptic device 1204 may limit or augment a user's movement. To give a specific example, haptic device 1204 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use haptic device 1204 to send action requests to a console. Examples of action requests include, without limitation, requests to start an application and/or end the application and/or requests to perform a particular action within the application.

Figure 13:
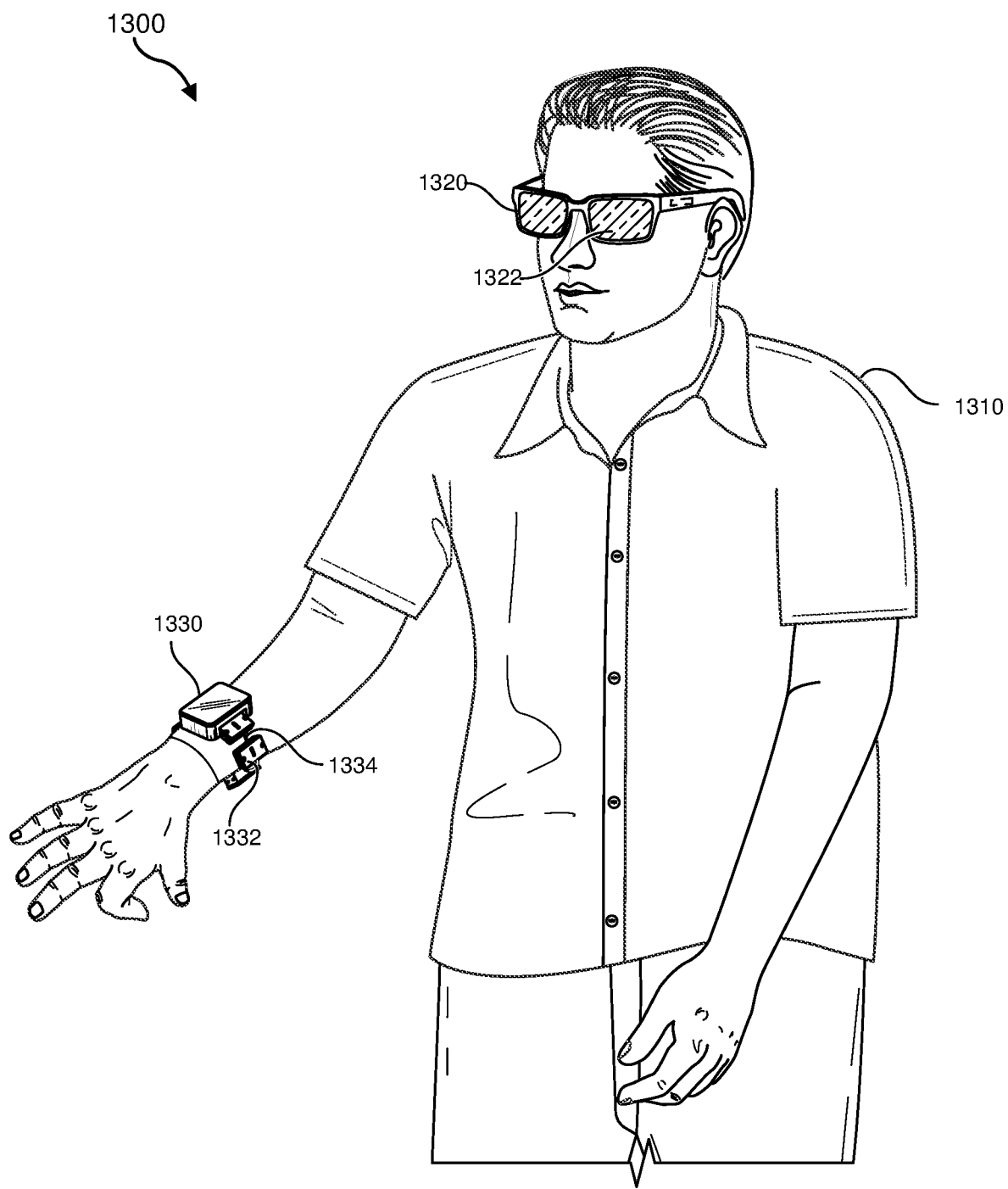
FIG. 13 is an illustration of an exemplary augmented reality environment according to embodiments of this disclosure.

While haptic interfaces may be used with virtual reality systems, as shown in FIG. 12, haptic interfaces may also be used with augmented reality systems, as shown in FIG. 13. FIG. 13 is a perspective view a user 1310 interacting with an augmented reality system 1300. In this example, user 1310 may wear a pair of augmented reality glasses 1320 that have one or more displays 1322 and that are paired with a haptic device 1330. Haptic device 1330 may be a wristband that includes a plurality of band elements 1332 and a tensioning mechanism 1334 that connects band elements 1332 to one another.

One or more of band elements 1332 may include any type or form of actuator suitable for providing haptic feedback. For example, one or more of band elements 1332 may be configured to provide one or more of various types of cutaneous feedback, including vibration, force, traction, texture, and/or temperature. To provide such feedback, band elements 1332 may include one or more of various types of actuators. In one example, each of band elements 1332 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1110, 1120, 1204, and 1330 may include any suitable number and/or type of haptic transducer, sensor, and/or feedback mechanism. For example, haptic devices 1110, 1120, 1204, and 1330 may include one or more mechanical transducers, piezoelectric transducers, and/or fluidic transducers. Haptic devices 1110, 1120, 1204, and 1330 may also include various combinations of different types and forms of transducers that work together or independently to enhance a user's artificial-reality experience. In one example, each of band elements 1332 of haptic device 1330 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
    at least one light-emitting device;
    a buck driver circuit electrically coupled to the light-emitting device, wherein the buck driver circuit includes an inductor; and
    a boost circuit electrically coupled between the buck driver circuit and a power source, wherein the boost circuit includes an additional inductor and excludes a bypass capacitor that runs parallel with the light-emitting device.

2. The apparatus of claim 1, further comprising:
    a node that electrically couples the buck driver circuit and the boost circuit to one another; and
    an energy-storage capacitor that is electrically coupled between the node and a ground node.

3. The apparatus of claim 1, wherein the buck driver circuit is directly coupled to the light-emitting device via the inductor.

4. The apparatus of claim 1, wherein the light-emitting device comprises at least one of:
    at least one laser diode;
    a laser projector; or
    at least one pixel.

5. The apparatus of claim 1, wherein the boost circuit comprises a digital boost circuit.

6. The apparatus of claim 5, wherein the digital boost circuit includes a transistor electrically coupled to:
    the inductor;
    a step-up controller; and
    a ground node.

7. The apparatus of claim 6, further comprising a node that electrically couples the buck driver circuit and the boost circuit to one another; and
    wherein the boost circuit comprises an analog-to-digital converter coupled between the node and the step-up controller.

8. The apparatus of claim 1, wherein the buck driver circuit includes a transistor electrically coupled to:
    the boost circuit;
    a step-down controller; and
    the additional inductor.

9. The apparatus of claim 8, wherein the buck driver circuit comprises:
    a first comparator that includes:
        a plurality of inputs coupled to:
            an anode of the light-emitting device; and
            a first signal that represents a maximum reference voltage; and
        an output coupled to the step-down controller; and
    a second comparator that includes:
        a plurality of additional inputs coupled to:
            the anode of the light-emitting device; and
            a second signal that represents a minimum reference voltage; and
        an additional output coupled to the step-down controller.

10. The apparatus of claim 1, further comprising:
    a memory device that stores at least one of:
        aging data that identifies an age of the light-emitting device; or
        temperature data that identifies an operating temperature of the light-emitting device; and
    at least one processor communicatively coupled to the memory device and the buck driver circuit, wherein the processor:
        accesses the aging data or the temperature data from the memory device; and
        programs the buck driver circuit such that the buck driver circuit dynamically adjusts an output provided to the light-emitting device based at least in part on the aging data or the temperature data.

11. The apparatus of claim 1, wherein the light-emitting device is incorporated into a head-mounted display dimensioned to be worn by a user of an artificial reality system; and
    further comprising at least one diffractive optical element that manipulates light projected by the light-emitting device to form a dot pattern for visual presentation to the user of the artificial reality system via the head-mounted display.

12. The apparatus of claim 11, wherein the dot pattern formed by the diffractive optical element comprises at least one of:
    line patterns;
    hatching patterns; or
    crosshatching patterns.

13. The apparatus of claim 1, further comprising at least one processor communicatively coupled to the boost circuit, wherein the processor:
    receives an input signal representative of a voltage level of a node within the boost circuit;
    generates a digital waveform commensurate with the voltage level represented by the input signal; and
    providing the digital waveform to a step-up converter that drives a switching regulator of the boost circuit.

14. The apparatus of claim 13, wherein the processor modifies a feature of the digital waveform to increase or decrease an amount of electric current that passes through the switching regulator of the boost circuit.

15. The apparatus of claim 14, wherein the feature of the digital waveform comprises at least one of:
    a duty cycle of the digital waveform; or
    a frequency of the digital waveform.

16. A system comprising:
    a visual display that includes at least one light-emitting device;
    a buck driver circuit electrically coupled to the light-emitting device included in the visual display, wherein the buck driver circuit includes an inductor; and
    a boost circuit electrically coupled between the buck driver circuit and a power source, wherein the boost circuit includes an additional inductor and excludes a bypass capacitor that runs parallel with the light-emitting device.

17. The system of claim 16, further comprising:
a node that electrically couples the buck driver circuit and the boost circuit to one another; and
an energy-storage capacitor that is electrically coupled between the node and a ground node.

18. The system of claim 16, wherein the buck driver circuit is directly coupled to the light-emitting device via the inductor.

19. The system of claim 16, wherein the light-emitting device comprises at least one of:
at least one laser diode;
a laser projector; or
at least one pixel.

20. A method comprising:
assembling a buck driver circuit that includes an inductor and excludes a bypass capacitor that runs parallel with at least one light-emitting device included in a head-mounted display dimensioned to be worn by a user of an artificial reality system;
assembling a boost circuit that includes an additional inductor;
electrically coupling the buck driver circuit to the at least one light-emitting device included in the head-mounted display dimensioned to be worn by the user of the artificial reality system; and
electrically coupling the boost circuit between the buck driver circuit and a power source.

* * * * *